May 18, 1965  J. K. SHANNON  3,184,343
BATTERY COVER TERMINAL BOSS
Filed Nov. 15, 1961
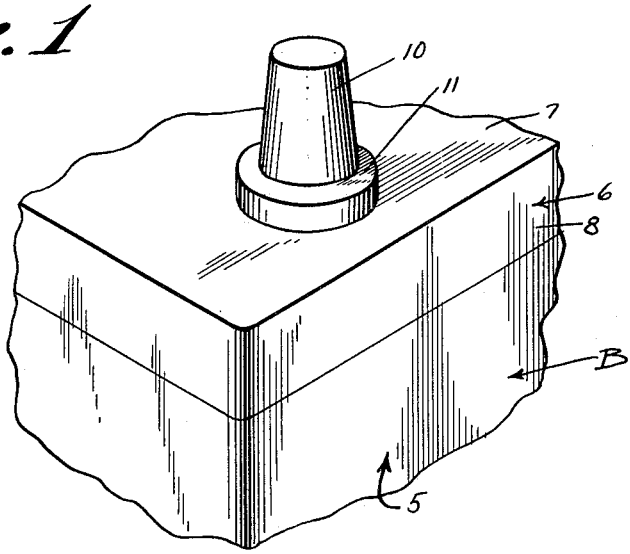
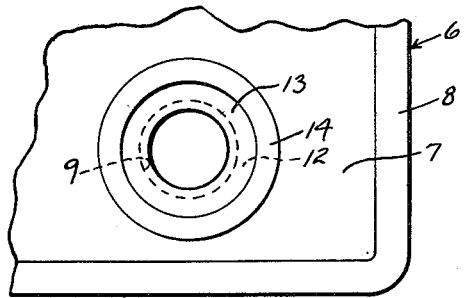
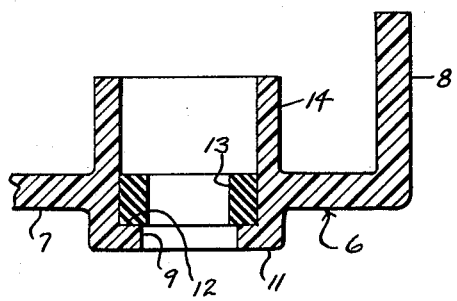
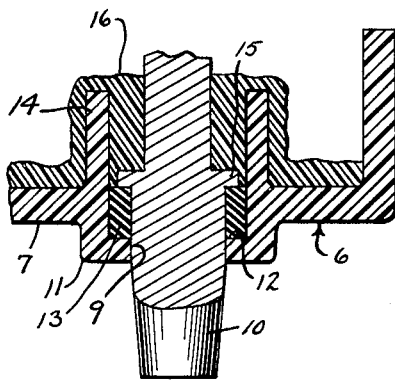
INVENTOR
JOHN K. SHANNON
BY Wright and Wright
ATTORNEYS 3,184,343
BATTERY COVER TERMINAL BOSS
John K. Shannon, 2028 63rd Place, Kenosha, Wis.
Filed Nov. 15, 1961, Ser. No. 152,473
2 Claims. (Cl. 136—168)

This invention appertains to storage batteries and more particularly to a novel means for mechanically uniting a terminal post to a battery cover for strength, and to obtain a leakproof joint and is a further improvement in the art as exemplified by my prior application Serial No. 90,487 filed February 20, 1961.

In order to obtain a leakproof joint between a terminal post and the cover of the case of a storage battery, it is common practice to utilize a rubber gasket seated in a groove in an outwardly extending boss or enlargement on the cover and to press the terminal post through the gasket (see FIGS. 3 and 5 of my above mentioned pending application). The seal between the gasket and post should be effective to prevent leakage of electrolyte therebetween. However, as the plate assemblies and terminal posts are placed in position, the assembly may tilt and a good seal is not obtained between the gasket and cover and leakage is liable to occur. Likewise, with this construction, the thinness of the gasket is limited and contact area between the gasket, post and cover is small and a leakproof construction is not assured. Little support is given to the terminal posts by the cover and this results in a weak unsatisfactory construction.

One of the primary objects of my invention is to provide a novel mechanical bond between the terminal posts and battery cover to insure a positive leakproof seal and a proper and effective sturdy support between the cover and the posts.

Another salient object of my invention is to provide an interior hollow boss extending a material distance into the battery and beyond the inner face of the gasket for surrounding the gasket and to provide a dam or retaining means for a plastic, which is poured in a free flowing state into the hollow boss, whereby upon the solidifying of the plastic a complete and effective seal will be provided for the gasket, post and cover and at the same time provide a rugged support between the cover and the post.

A further object of my invention is to utilize the same plastic material for the hollow boss as is employed for filling the cover during the uniting of the cover with the case and the enveloping of the plate lug shoulders, jump straps etc. (see my pending application), the plastic material being poured into the hollow boss and allowed to flow over and around the hollow boss and into the cover, whereby upon the solidifying of the plastic, the boss will be completely enveloped and the plastic will unite with the cover and its boss to form a homogeneous whole.

With these and other objects in view, the invention consists in the novel construction, arrangement and formation of parts, as will be hereinafter more specifically described and claimed and illustrated in the accompanying drawing, in which drawing, FIGURE 1 is a fragmentary perspective view of a corner of a storage battery provided with my cover and terminal post connection;

FIGURE 2 is a fragmentary bottom plan view of the cover prior to the insertion of the terminal post into the same and the gasket and prior to the pouring of the plastic into the cover;

FIGURE 3 is a detail fragmentary sectional view through the cover showing the novel hollow boss with the gasket seated therein prior to the receiving of the terminal post, and FIGURE 4 is a view similar to FIGURE 3 but with the terminal post pressed through the gasket and the plastic poured into and around the hollow boss and into the cover.

Referring to the drawing in detail, wherein similar reference characters designate corresponding parts throughout the several views, the letter B generally indicates a storage battery constructed in accordance with my present invention. The battery also utilizes principles of my prior invention shown in the mentioned pending application.

The battery B, as illustrated, includes a case 5 and a cover 6. The cover 6 preferably includes a flat top wall 7 and a depending flange or skirt 8 which fits over the upper edge of the case. The cover 6 is provided with an opening 9 through which the battery terminal post 10 extends. It is to be understood of course, that the battery is provided with the usual terminal post at each end.

As illustrated, the outer surface of the cover has molded or formed thereon an exterior hollow enlargement 11 provided with a seat 12. The seat 12 has pressed thereon a rubber or like gasket 13. The gasket 13 is of a greater height than the gaskets as usually employed in batteries, and is of a greater height than the gaskets shown in my pending application.

Also in accordance with my invention, I provide an interior hollow boss 14 which completely surrounds the opening 9 and the gasket 13. This hollow boss is in the nature of an annular skirt and the same depends from the top wall 7 of the battery cover, when the battery is in its normal upright position. The boss 14 extends a material distance inward of the inner surface of the wall 7 of the cover 6, and a material distance beyond the gasket. At this time it is to be noted that the gasket 13 has an interior diameter slightly less than the exterior diameter of the terminal post 10. By referring to FIGURE 4, it can be seen that the post 10 has formed thereon an outwardly extending annular shoulder 15.

In the assembling of the battery, the post 10 is pressed into the gasket 13 until the annular shoulder 15 intimately engages the inner face of the gasket. As the gasket is formed from resilient material, the same will give to permit the insertion of the post into it and this provides an intimate contact between the gasket and the post.

With the cover in its inverted position, as shown in FIGURE 4 and with the plate assemblies united, the terminal posts are forced through end gaskets, as just explained above. Plastic material 16 in a free flowing condition is poured into the hollow boss 14 and the boss acts as a dam for the retention of the plastic material. The pouring of the plastic material is continued until the same overflows the hollow boss 14 and into the cover. Thus, the plastic material completely fills the hollow boss and envelops the same and flows into and covers the bottom wall of the cover. In accordance with the practice set forth in my pending application, the battery case 5 is now placed in position and upon the solidifying of the plastic the battery is turned to its normal upright position. With the solidifying of the plastic the cover with the boss 14 is united with the case and the plastic, the cover and the case then form a homogeneous whole.

The plastic 16 is of a type that is compatible with the material forming the cover 6 and the case 5 and can be an epoxy resin, a polyester or polyethylene.

Upon the solidifying of the plastic, it can be seen that the boss is completely enveloped and that the gasket 13 is sealed in place and covered by the plastic. This provides the desired leakproof joint. The formation of the hollow boss 14 is such as to retain a desired amount of the plastic so that the plastic will form a sturdy support for the post.

Various changes in details may be made without departing from the spirit or the scope of this invention, but what I claim as new is:

1. In a storage battery including a cover and battery terminal posts affixed thereto, said cover comprising a top wall with a depending peripheral flange, said top wall having battery terminal post openings therein, each opening having a seat, and each said seat having pressed thereon a gasket, a hollow boss completely surrounding said opening on the interior surface of said top wall, said boss extending a material distance beyond said gasket, a battery terminal post in each said opening, said gasket, and said hollow boss, said boss having a greater internal diameter than the diameter of said post thereby providing a dam for the retention of poured plastic material, and plastic material completely filling the space between said boss and said terminal post and extending over the end of said boss and the outside thereof and onto the inside surface of said top wall whereby more effective sealing of said terminal post to said cover is accomplished.

2. In a storage battery including a cover and battery terminal post affixed thereto, said cover comprising a top wall with a depending peripheral flange, said top wall having battery terminal post openings therein, each opening having a seat and each seat having pressed thereon a gasket, a hollow boss completely surrounding said opening on the interior surface of said top wall, said boss extending a material distance beyond said gasket, a battery terminal post in each said opening, said gasket and said hollow boss, said battery terminal post having an outwardly extending annular shoulder thereon which is seated against said gasket, said boss having a greater internal diameter than the diameter of said post and said annular shoulder thereby providing a dam for the retention of poured plastic material, and plastic material completely filling the space between said boss and said terminal post and extending over the end of said boss and the outside thereof and onto the inside surface of said top wall whereby more effective sealing of said terminal post to said cover is accomplished.

References Cited by the Examiner
UNITED STATES PATENTS

| | | |
|---|---|---|
| 1,342,954 | 6/20 | Gardiner. |
| 1,373,241 | 3/21 | Heberling et al. |
| 1,509,583 | 9/24 | Caldbeck. |
| 2,100,921 | 11/37 | Ralph. |
| 2,880,261 | 3/59 | Duncan _____ 136—170 |

JOHN H. MACK, *Primary Examiner.*

JOHN R. SPECK, *Examiner.*